United States Patent
Samela et al.

(10) Patent No.: US 10,272,376 B2
(45) Date of Patent: Apr. 30, 2019

(54) LOUVERED SEPARATOR

(71) Applicant: ALUPRO OY, Tuusula (FI)

(72) Inventors: Vesa Samela, Mäntsälä (FI); Juha Kivekäs, Espoo (FI)

(73) Assignee: ALUPRO OY, Tuusula (FI)

( * ) Notice: Subject to any disclaimer, the term of this patent is extended or adjusted under 35 U.S.C. 154(b) by 60 days.

(21) Appl. No.: 15/129,531

(22) PCT Filed: Apr. 13, 2015

(86) PCT No.: PCT/FI2015/050251
§ 371 (c)(1),
(2) Date: Sep. 27, 2016

(87) PCT Pub. No.: WO2015/193537
PCT Pub. Date: Dec. 23, 2015

(65) Prior Publication Data
US 2017/0157545 A1 Jun. 8, 2017

(30) Foreign Application Priority Data

Jun. 18, 2014 (FI) ..................................... 20145582

(51) Int. Cl.
*B01D 45/00* (2006.01)
*B01D 45/08* (2006.01)
(Continued)

(52) U.S. Cl.
CPC ............ *B01D 45/08* (2013.01); *B01D 45/06* (2013.01); *B01D 45/10* (2013.01); *B01D 45/16* (2013.01); *E06B 7/08* (2013.01); *F24F 13/082* (2013.01)

(58) Field of Classification Search
CPC ........ B01D 45/08; B01D 45/16; B01D 45/06; B01D 45/10; F24F 13/082; E06B 7/08
See application file for complete search history.

(56) References Cited

U.S. PATENT DOCUMENTS 1,519,428 A * 12/1924 Wilisch .................. B01D 45/08
159/31
2,532,332 A * 12/1950 Rowand ................. B01D 45/08
55/444
(Continued)

FOREIGN PATENT DOCUMENTS

DE 368667 C 2/1923
DE 2553198 A1 6/1977
(Continued)

OTHER PUBLICATIONS

Supplementary European Search Report completed on Jan. 22, 2018 and dated Jan. 29, 2018 in corresponding European Patent Application No. 15808940, 2 pages.

*Primary Examiner* — Dung H Bui
(74) *Attorney, Agent, or Firm* — Robert P. Michael, Esq.; Carter, DeLuca & Farrell LLP

(57) ABSTRACT

A louvered separator for separating water from an air flow is provided which includes a number of vertical slat structures having a constant profile, horizontally spaced from each other so as to form horizontally tortuous separating channels in the spaces between the slats. The slat structures include water-collecting troughs and two separate slats having differing constant profiles; in the air flow direction a foremost front slat and a following back slat. The front slat includes, in the flow direction, a leading edge, a middle area and a trailing edge, and the back slat includes, in the flow direction, a leading edge, a middle area and a trailing edge. The water-collecting trough is limited to the area of the trailing edge of the back slat, so that the front slat entirely, and the back slat for more than a half of its length from the leading edge towards the trailing edge, form only even surfaces to guide the flow.

20 Claims, 2 Drawing Sheets

(51) Int. Cl.
    *B01D 45/06*         (2006.01)
    *B01D 45/10*         (2006.01)
    *B01D 45/16*         (2006.01)
    *F24F 13/08*         (2006.01)
    *E06B 7/08*         (2006.01)

(56) References Cited

U.S. PATENT DOCUMENTS

| | | | | |
|---|---|---|---|---|
| 3,358,580 A | * | 12/1967 | Freese | B01D 45/08 454/277 |
| 3,673,771 A | | 7/1972 | Dickey | |
| 3,771,430 A | | 11/1973 | Lane | |
| 3,849,095 A | | 11/1974 | Regehr | |
| 3,953,183 A | * | 4/1976 | Regehr | B01D 45/08 55/440 |
| 4,028,077 A | * | 6/1977 | Gleason | B01D 45/08 55/442 |
| 4,036,612 A | * | 7/1977 | Guttmann | B01D 45/08 55/282 |
| 4,157,250 A | * | 6/1979 | Regehr | B01D 47/06 55/424 |
| 4,175,938 A | * | 11/1979 | Regehr | B01D 45/16 55/440 |
| 4,204,847 A | * | 5/1980 | Ko | B01D 45/08 55/440 |
| 4,310,993 A | * | 1/1982 | White | E06B 7/082 454/277 |
| 4,430,101 A | * | 2/1984 | Sixsmith | B01D 45/06 55/440 |
| 4,543,108 A | * | 9/1985 | Wurz | F28C 1/16 55/440 |
| 4,557,740 A | | 12/1985 | Smith | |
| 4,581,048 A | * | 4/1986 | Svoboda | F22B 37/28 55/307 |
| 4,581,051 A | * | 4/1986 | Regehr | B01D 45/16 55/440 |
| 4,704,145 A | * | 11/1987 | Norris | F02C 7/052 55/306 |
| 4,738,585 A | * | 4/1988 | von Bockh | F22B 37/28 415/115 |
| 4,938,785 A | * | 7/1990 | MacPherson, Jr. | B01D 45/16 55/439 |
| 5,112,375 A | * | 5/1992 | Brown | B01D 45/08 55/440 |
| 5,268,011 A | | 12/1993 | Wurz | |
| 6,083,302 A | * | 7/2000 | Bauver, II | B01D 45/08 55/440 |
| 6,149,515 A | * | 11/2000 | Van Becelaere | F24F 13/075 454/277 |
| 6,171,379 B1 | * | 1/2001 | Rolland | B01D 45/08 55/434.2 |
| 6,266,923 B1 | * | 7/2001 | Lee | E06B 7/086 49/74.1 |
| 6,770,121 B1 | * | 8/2004 | Sindel | B01D 45/08 55/435 |
| 7,618,472 B2 | * | 11/2009 | Agnello | B01D 45/08 55/440 |
| 7,842,114 B2 | * | 11/2010 | Xu | B01D 45/08 55/440 |
| 7,905,937 B2 | * | 3/2011 | Nieuwoudt | B01D 45/06 55/416 |
| 2003/0000390 A1 | * | 1/2003 | Yuan | B01D 45/08 96/357 |
| 2003/0024873 A1 | * | 2/2003 | Klass | B01D 45/14 210/512.3 |
| 2004/0148899 A1 | * | 8/2004 | Pertile | E04L 37/163 52/581 |
| 2005/0022482 A1 | * | 2/2005 | Bockle | B01D 45/16 55/321 |
| 2007/0137154 A1 | | 6/2007 | Agnello et al. | |
| 2007/0264922 A1 | | 11/2007 | Astourian | |
| 2008/0257162 A1 | * | 10/2008 | Neubauer | B01D 45/08 96/296 |
| 2009/0101014 A1 | * | 4/2009 | Baseotto | B01D 45/08 95/272 |
| 2010/0071560 A1 | * | 3/2010 | Daniel | B01D 45/08 96/189 |
| 2010/0089242 A1 | * | 4/2010 | Buthmann | B01D 45/08 96/190 |
| 2010/0199619 A1 | * | 8/2010 | Buzanowski | B01D 45/06 55/443 |
| 2010/0206170 A1 | * | 8/2010 | Geisner | B01D 45/08 96/190 |
| 2010/0326026 A1 | * | 12/2010 | Bratton | B01D 45/06 55/440 |
| 2012/0079946 A1 | * | 4/2012 | Dold | B01D 45/08 96/425 |
| 2012/0297980 A1 | * | 11/2012 | Slaughter | B01D 45/08 95/272 |
| 2013/0224081 A1 | * | 8/2013 | Helmberg | B01D 45/08 422/176 |
| 2014/0360708 A1 | * | 12/2014 | Padovan | F22B 37/26 165/170 |
| 2015/0135661 A1 | * | 5/2015 | MacDonald | F24F 13/082 55/440 |
| 2015/0266145 A1 | * | 9/2015 | Valsler | B01D 45/08 55/437 |
| 2016/0245176 A1 | * | 8/2016 | Sheoran | F02C 7/052 |
| 2017/0089208 A1 | * | 3/2017 | Kippel | F02C 7/052 |

FOREIGN PATENT DOCUMENTS

DE         102004030519 A1     1/2006
WO         2013163379 A1     10/2013

\* cited by examiner

LOUVERED SEPARATOR

CROSS REFERENCE TO RELATED APPLICATIONS

This application is a national stage application of International Application No. PCT/FI2015/050251, filed on Apr. 13, 2015, which claims the benefit of and priority to Finnish Patent Application No. 20145582, filed on Jun. 18, 2014, the entire contents of each of which are hereby incorporated by reference herein in their entireties.

FIELD OF THE INVENTION

The invention relates to a louvered water separator for separating water from an air flow in connection with different types of air intake openings, such as in connection with engines and air conditioning devices.

BACKGROUND OF THE INVENTION

The prior art in the field of the invention has been disclosed for example in patent publications U.S. Pat. No. 5,268,011, US2007137154, WO2013163379, U.S. Pat. Nos. 3,771,430, 3,849,095 and 4,557,740.

Louvered separators are used especially to separate water in the form of droplets from an air flow. Particularly in ships, oil platforms and similar marine conditions, the combustion air taken for engines and the fresh air taken for air conditioning devices contains so much water that, as such, it would quickly destroy the devices. Thus, the water must be removed from the air flow.

Due to large amounts of air, any filtering fabrics or other jackets may not be considered because of high pressure losses. Thus, the separation of water is conducted in vertical louvers in which a large number of identical slats form, in the spaces between the slots, tortuous channels in which the droplets, as they are heavier than air, are separated due to the centrifugal force onto the outer edges of the channels and into the troughs provided therein, while the dry air flow moves past the troughs and through the louver.

However, there are some drawbacks in the prior art. The water separating profiles do not work flawlessly because the water-collecting troughs therein give rise to rough vortices within the air flow which mix the air flow and thus cause significant pressure losses. The vortical motion of the flow also produces an uncontrolled flow of the droplets. Thus, a large amount of the water droplets are able to pass through the water separator, unless the separating channels are made long and extremely staged in such a way that a sufficient total separating capacity will be reached, which again leads to significant pressure losses. Thus, in the known water separators the separating capacity and pressure losses are both of an unsatisfactory level.

Objective of the Invention

The objective of the invention is to remedy the above-mentioned defects of the prior art. Specifically, the objective of the invention is to disclose a new louvered separator which allows even more efficient separation of water with notably lower pressure losses.

SUMMARY OF THE INVENTION

The invention relates to a louvered water separator for separating water from an air flow. The louvered separator comprises a number of vertical slat structures having a constant profile, horizontally spaced from each other so as to form horizontally tortuous separating channels in the spaces between the slats. The slat structure is provided with water-collecting troughs so that water droplets are collected in the troughs, while dry air is able to flow past them. One slat structure comprises two separate slats having differing constant profiles; in the air flow direction a foremost front slat and a following back slat. The front slat comprises, in the air flow direction, a leading edge, a middle area and a trailing edge, and the back slat comprises, in the air flow direction, a leading edge, a middle area and a trailing edge. According to the invention, the water-collecting trough of the slat structure is limited to the area of the trailing edge of the back slat, so that the front slat entirely, and the back slat for more than a half of its length from the leading edge towards the trailing edge, form only even surfaces to guide the flow.

Thus, it is an essential feature of the louvered water separator according to the invention that the air flow moving through the louver is not constantly disturbed by producing turbulence; instead, the moist flow is arranged to pass through the louver as a smooth and vortex-free laminar flow where the moisture has moved to one edge of the flow. It is not until this stage as the flow reaches the water-collecting trough. This way, the separating capacity of the louvered water separator can be maximized with minimal flow resistance.

In one preferred embodiment of the invention, the water-collecting troughs are provided on both surfaces of the back slat close to the trailing edge. The troughs are provided so close to the trailing edge that in practice they from the trailing edge of the back slat, whereby the back slat ends, in the flow direction, at these water collecting troughs.

Preferably, the water-collecting troughs extend backwards, relative to the flow direction, from the trailing edge for not more than 30% of the length of the back slat. This distance is suitably less than 20%, for example less than 15% of the length of the back slat, even less than 10% of the length of the back slat. Thus, the back slat first guides and smoothens the air flow nearly over its entire length, and it is not until right at the end of the back slat, i.e. just before the trailing edge, that the water droplets are separated from the flow.

In one embodiment of the invention, the troughs are provided at different distances from the trailing edge on the opposite surfaces of the back slat. As they are not provided in complete alignment, they do not increase the thickness of the trailing edge of the slat too much, which also reduces turbulence caused by the slat structure in the air flow.

Throughout the length of the front slat and through a major part of the length of the back slat, the air flow will be smoothed and water droplets deposited as a relatively dense layer on the surfaces of the back slat. Thus, the height of the water-collecting troughs from the surface of the slat, i.e. the trough opening, may be relatively small. Accordingly, it is preferred that the trough opening is less than 10%, preferably less than 8%, for example approximately 5% of the length of the back slat.

The front slat and the back slat of the structure according to the invention are not provided, in the air flow direction, in single file and direct alignment with each other; instead they are disposed, to some extent, adjacently in the transverse direction and at a distance from each other. Thus, the leading edge of the back slat is preferably provided, in the air flow direction, before the trailing edge of the front slat in such a way that the front slats and the back slats alternate at substantially the same distances, approximately 1:2-2:1, from each other in the area of the leading edge of the back slat and the trailing edge of the front slat.

In one embodiment of the invention, the trailing edge of the back slat comprises a separating groove, i.e. a Kamm tail, formed by a groove that opens in the flow direction, i.e. forward, from the trailing edge. This structure that is known per se in other connections significantly reduces the vortical motion of the flow that moves over the trailing edge of the back slat.

In one embodiment of the invention, at least one but most suitably both, i.e. the front slat and the back slat, are hollow aluminum profiles. Hollow profiles are easy to manufacture from aluminum through a die and, in addition to the profile becoming lighter and requiring less material, a flow channel extending from one end of the profile to the other can also be formed inside the profile. The flow channels may be used as fluid passages, i.e. heat conveyors, in order to adjust, i.e. heat or cool, the slats and thus control the collection and recovery of water droplets that flow past the slats, or in order to prevent the freezing of water on the slats.

In one embodiment of the invention, the front slat is a smooth-surfaced airfoil that curves in one direction only and has a relatively sharp trailing edge. In another embodiment of the invention, the front slat is a smooth-surfaced airfoil that curves in two different directions, i.e. first in one direction and then in the other, and has a relatively sharp trailing edge.

In different embodiments of the invention, the back slat may correspondingly be an airfoil that curves in either one or two directions; however, it does not end at a sharp trailing edge but at one or more water-collecting troughs provided at the trailing edge.

The water separator according to the invention is designed to provide the air flow as a flow which is as laminar, vortex-free and smooth as possible and in which the water may not be separated and removed from the air flow until at the end of the louver, i.e. in proximity to the trailing edge of the back slat. Thus, the flow resistance and pressure losses are low throughout the louver. In a preferred embodiment of the invention, the vortex-free and controlled flow can be improved even further by providing a rectifier for the air flow. The rectifier may be a thin-walled and straight cellular structure, specifically a honeycomb structure, which receives, guides and gives out the air flow moving through the rectifier in a linear orientation. The rectifier can be disposed in front of or behind the louver structure or even in both positions.

In one embodiment of the invention, the rectifier provided in front of the louvered separator comprises a heat exchanger structure for cooling the air flow. By cooling the air flow before the louvered separator, the size of the droplets in the air flow is increased and thus the separating capacity of the water separator improved.

As stated above, the front slat and the back slat are vertical constant profiles throughout their height. They are thus most suitably supported and secured to a suitable frame or other supporting structure only from their ends. This way, vortices will not be created in the air flow passing through the slats due to any added supports to impair the separation. Preferably, the hollow slat profiles contain a portion of a circular cross section, and this circular portion is further threaded at the ends of the slats. Thus, the ends of the slats may be fastened with bolts to the surrounding frame or other supporting structure. The bottom of the water-collecting trough may also contain a similar circular portion and similar threads at the ends of the profile, so that the back slat may also be supported from the trailing edge, which can not be provided with a hollow portion due to its thin structure.

In a preferred embodiment of the invention, the curvature of the front slat in proximity to the trailing edge thereof is substantially parallel to the curvature of the back slat after the leading edge thereof. Thus, the air flow guided by the front slat to the leading edge of the back slat and further to both sides of the back slat is substantially evenly curving and vortex-free.

Preferably, the back slat is curved in one direction only, i.e. in the same direction as the trailing edge end of the front slat, in such a way that the vortex-free air flow guided by the front slat to the back slat curves evenly so as to guide the heavy water droplets along the surface of the back slat into the collecting trough in proximity to the trailing edge of the back slat. As the front slat guides the laminar flow to the concave surface of the back slat, the water-collecting trough is provided in proximity to the trailing edge on the concave surface of the back slat. In other words, the invention does not aim at collecting and removing the water in a number of different stages along the louver structure, which would produce vortices; instead, the air flow is smoothed and steadied so that the water droplets are lastly separated in an efficient way into the trough at the trailing edge of the back slat. As another water-collecting trough is also provided in proximity to the trailing edge on the convex surface of the back slat, the water droplets adhered on the convex surface can also be efficiently collected.

The shape of the louvered water separator according to the invention may vary even to a great degree depending on the purpose of use. In functional terms, the slats are always provided vertically and side by side, so that the water is collected in the troughs and is able to flow down and out of the structure. However, the slats may form straight surfaces or surfaces that curve in different ways. Likewise, it is possible that the slats are provided in a closed circle, in which case the air flows through the slats into a cylindrical space and further from above and/or below to the destination.

Advantages Provided by the Invention

The louvered water separator according to the invention has considerable advantages over the prior art. Based on the tests and calculations performed, the pressure loss factor decreases from an approximate value of 12 to a value of 3 as compared to the corresponding prior louvered separators. As the pressure losses are significantly lower, the size and power of the blowers required for air intake can be reduced accordingly. Also, the water separating capacity is better than with prior structures, whereby smaller devices requiring less power provide intake air that contains less water.

BRIEF DESCRIPTION OF THE DRAWINGS

The invention will be described below in detail with reference to the accompanying drawings, in which.

DETAILED DESCRIPTION OF THE INVENTION

Figure 1:
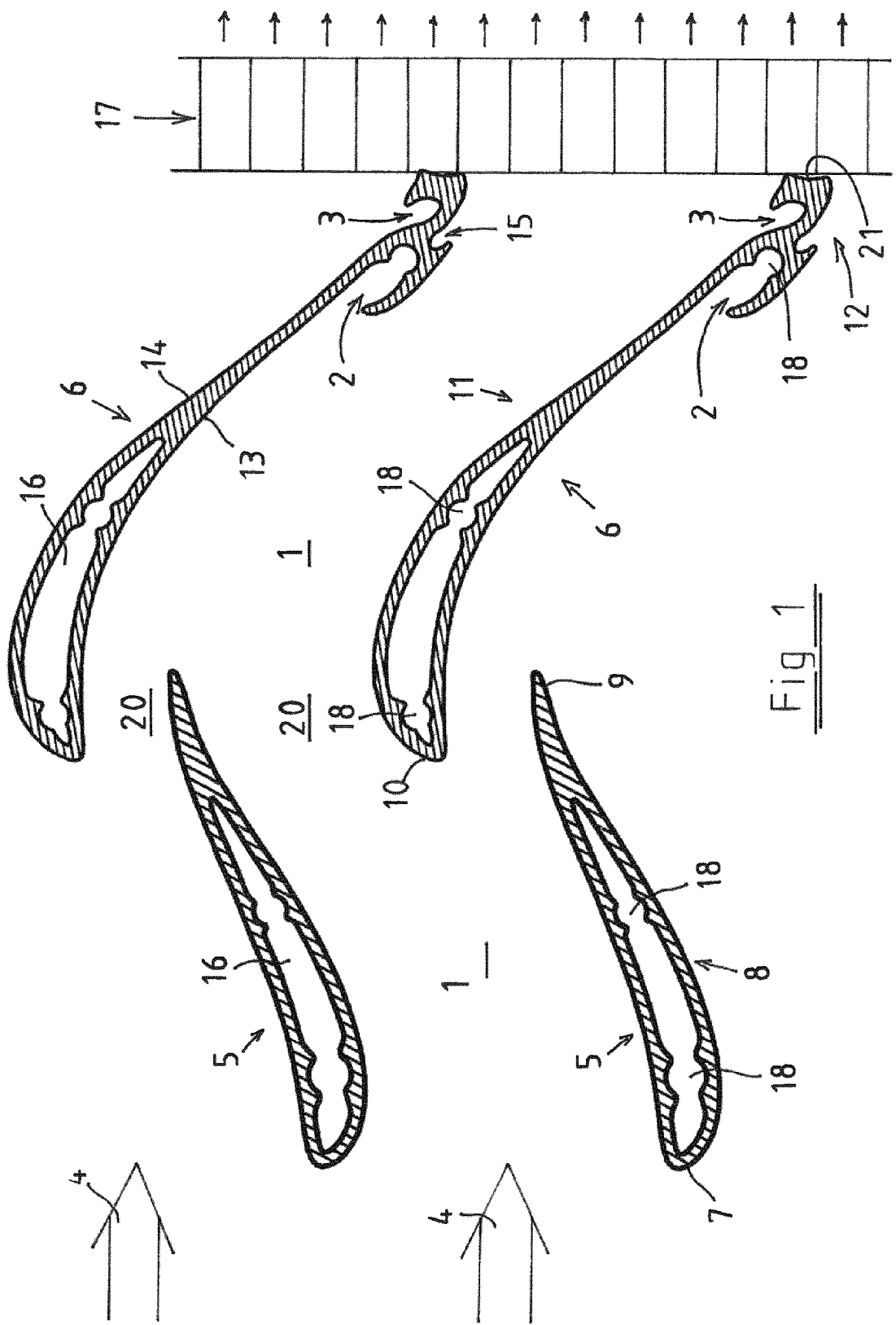
FIG. 1 is a horizontal section of part of one louvered water separator according to the invention.

FIG. 1 illustrates a small part only of one plane louvered separator according to the invention, i.e., as seen from above or below, the profiles of two adjacent slat structures and the corresponding part of a rectifier 17 provided, in a flow direction 4, behind the profiles. A complete louvered separator may practically contain several tens of such identical adjacent slat structures, the slat structures being up to several meters long and the rectifier extending through the entire surface area delimited by the slats, i.e. through their total height and width.

The slat structure illustrated in FIG. 1 consists in this invention of two separate slats, a front slat 5 and a back slat 6. The air flow direction 4 through the louver is from left to right in the figure. The front slat 5 that is shaped as an airfoil is circular at a leading edge 7, increasing in its thickness and slightly curving, in the flow direction, to the left, i.e. in a first direction. The front slat is thickest at approximately ¼ of its length from the front edge, in its middle area 8, and further on begins to steadily narrow. At the same time, approximately halfway through the length of the cross section of the profile, it straightens and gradually begins to turn right, i.e. in the opposite direction, so as to taper to a relatively sharp trailing edge 9.

The profile of the front slat is hollow, i.e. a channel 16 is formed inside the front slat so as to extend through the total length of the front slat 5 and, in the direction of the width of the front slat, i.e. in the direction of the length of the profile, from the leading edge 7 over the middle area 8 and further on near to the trailing edge 9 of the profile. The profile contains two profile shapes 18 with circular outlines, i.e. round shapes, in which threads have been machined at both ends of the front slat 5 for allowing a bolted jointing of the front slat to a suitable frame or a similar frame structure from its both ends.

The back slat 6 that is also substantially shaped as an airfoil is disposed close but not in contact to the front slat 5. The front edge, i.e. the leading edge 10, of the back slat 6 is provided, in the air flow direction 4, at a distance before the trailing edge 9 of the front slat 5 in such a way that passages 20 are formed between the front slat 5 and two adjacent back slats 6 so as to guide the air flow from the guidance of the front slat to the back slat. The front slat 5 is horizontally offset from the back slat 6 approximately halfway between two back slats 6 in such a way that the widths of the passages 20 are of the same order. In FIG. 1, the width of the smaller passage is approximately half of the wider passage.

The back slat 6 is also rounded at the front edge, i.e. the leading edge 10, and sharply increasing in its thickness. The curvature of the concave surface 13 of the back slat that slopes, in the flow direction 4, to the right is first substantially the same as the curvature of the corresponding area of the front slat 5, so that the passage 20 provided between them is substantially uniform in thickness. The back slat 6 curves to the right substantially through the total length of the profile, gradually bending less and less toward the end and becoming straight, or possibly even slightly curved in the opposite direction, close to the trailing edge 12.

A water-collecting trough 2 is provided close to the trailing edge 12 on the concave surface 13. The opposite surface, i.e. a convex surface 14, of the back slat 6 is also provided, in proximity to the trailing edge 12, with another trough 3 for collecting water droplets to recover the droplets adhered on the convex surface 14. Further, a separating groove 15, or a socalled Kamm tail, is formed at the trailing edge of the back slat 6 so as to open, in the flow direction, out from the trailing edge for minimizing the vortices produced in the air flow as it leaves the trailing edge.

Also the back slat 6 is partly hollow, i.e. a channel 16 is provided inside the back slat to extend forward from the front edge, i.e. the leading edge 10, but only for less than halfway through the length of the profile. This channel also contains two circular profile shapes 18 for providing the jointing of the profiles with bolts from their ends. Further, a similar circular profile 18 is arranged at the bottom of the trough 2 provided on the concave surface 13.

The main purpose of the hollow structure of both profiles is to have the profiles as light as possible and the need of aluminum as small as possible. Thus, it is mainly dictated by the strength properties how large the hollow spaces can be and how thin the structures can be made.

In FIG. 1, a rectifier 17 formed as a honeycomb structure that continuously extends through the full length and width of all slats is fastened to the trailing edges 12 of the back slats 6. It is more specifically formed by thin walls which form cross-sectionally hexagonal straight tubes so as to constitute, in a side-by-side arrangement, a continuously extending honeycomb. The air flow passes through the honeycomb in a linear and vortex-free manner. Thus, it efficiently prevents or reduces the vortical motion even beforehand in the flow passages between the back slats.

The extreme end of the trailing edge 12 of the back slat 6 is provided with a slightly grooved surface that is transverse relative to the flow, namely a drill centering profile 21, in which the honeycomb structure can be easily centered and fastened with screws.

The cooperation of the front slat 2 and the back slat 3 provides a laminar flow that is as smooth as possible, allowing, in a curved centrifugal flow, an efficient separation of heavier water droplets from the air flow without producing considerable vortices that would increase the pressure losses. It is thus an essential feature of this structure that the flow is not disturbed within the slat structure; instead, the slat structure is allowed to uninterruptedly first form the air flow into a vortex-free and smooth laminar flow, and only after having been separated into its own layer the moisture is removed by means of the collecting troughs, right before the air flow leaves the slat structure.

Figure 2:
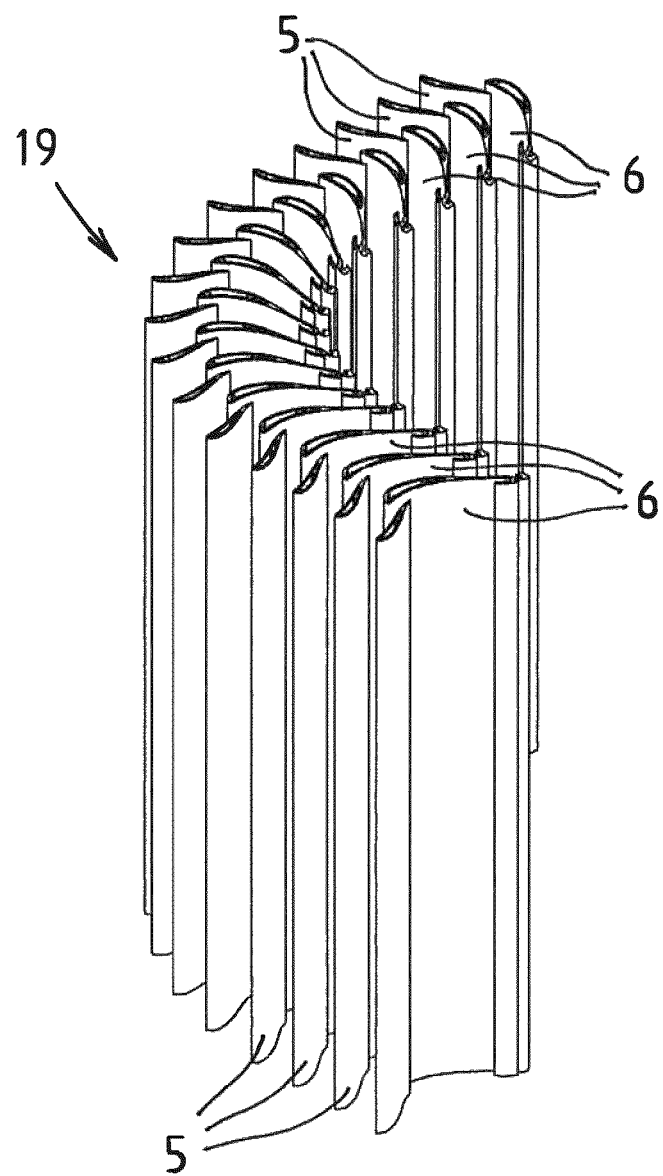
FIG. 2 illustrates one form of the louvered separator according to the invention.

FIG. 1 illustrates part of a linear and plane louvered separator. As shown in FIG. 2, the slat structures, i.e. the front slats 5 and the back slats 6, can as well be arranged as a curved surface 19. A curved shape allows the louvered separator to be installed for nearly any application. Thus, the louvered separator can even be a closed circular structure into which the air to be conditioned is taken from outside the louver, the air being conveyed through the louver and further from above and/or below to the destination.

The invention has been described above by way of example with reference to the accompanying drawings, different embodiments of the invention being possible within the scope defined by the claims.

The invention claimed is:
1. A louvered separator for separating water from an air flow, comprising:
a number of vertical slat structures having a constant profile, horizontally spaced from each other so as to form horizontally tortuous separating channels in the spaces between the slats, the vertical slat structures including water-collecting troughs and two separate slats having differing constant profiles, in an air flow direction a foremost front slat and a following back slat, whereby the front slat comprises, in the flow direction, a leading edge, a middle area and a trailing edge and the back slat comprises, in the flow direction, a leading edge, a middle area and a trailing edge, the front slat horizontally offset from the back slat such that air flow from both sides of the front slat flows through a passage defined between two adjacent back slats, wherein the leading edge of the back slat is provided, in the air flow direction, before the trailing edge of the front slat, wherein the water-collecting trough is limited to an area of the trailing edge of the back slat, so that the front slat entirely, and the back slat for more than a half of its length from the leading edge towards the trailing edge, form only smooth surfaces to guide the flow.

2. The louvered separator according to claim 1, wherein the water-collecting troughs are provided on both surfaces of the back slat close to the trailing edge.

3. The louvered separator according to claim 2, wherein the water-collecting troughs extend from the trailing edge for not more than 30% of the length of the back slat.

4. The louvered separator according to claim 2, wherein the troughs are provided at different distances from the trailing edge on opposite surfaces of the back slat.

5. The louvered separator according to claim 1, wherein the length of the trough in the flow direction is less than 15% of the length of the back slat.

6. The louvered separator according to claim 1, wherein an opening of the trough is less than 10%, of the length of the back slat.

7. The louvered separator according to claim 1, wherein the leading edge of the back slat is provided in such a way that the front slats and the back slats are alternately provided at substantially the same distances from each other in an area of the leading edge of the back slat and the trailing edge of the front slat.

8. The louvered separator according to claim 1, wherein the trailing edge of the back slat comprises a separating groove.

9. The louvered separator according to claim 1, wherein the front slat and/or the back slat are hollow aluminum profiles, whereby a channel provided within the profile is arrangeable to function as a flow channel for adjusting a temperature of the profile, for heating or cooling the profile.

10. The louvered separator according to claim 1, wherein the front slat is a smooth-surfaced airfoil that curves in one or two directions and has a relatively sharp trailing edge.

11. The louvered separator according to claim 1, wherein the back slat is an airfoil that curves in one or two directions.

12. The louvered separator according to claim 1, wherein an air flow rectifier, is provided, in the air flow direction, in front of and/or behind the louvered separator.

13. The louvered separator according to claim 1, wherein the front slat and the back slat comprise circular profile shapes for providing a bolted jointing of the slat from its ends.

14. The louvered separator according to claim 1, wherein the louvered separator comprises a number of slat structures which comprise a front slat and a back slat and are disposed in the same plane, whereby the louvered separator is a plane structure.

15. The louvered separator according to claim 1, wherein the louvered separator comprises a number of slat structures which comprise a front slat and a back slat and are disposed in a curved formation, whereby the louvered separator forms a curved surface.

16. The louvered separator according to claim 1, wherein the louvered separator comprises a number of slat structures which comprise a front slat and a back slat and are disposed along the same perimeter, whereby the louvered separator is a cylindrical structure.

17. The louvered separator according to claim 1, wherein the length of the trough in the flow direction is less than 10% of the length of the back slat.

18. The louvered separator according to claim 1, wherein the opening of the trough is less than 8% of the length of the back slat.

19. The louvered separator according to claim 8, wherein the separating groove is a Kamm tail.

20. The louvered separator according to claim 12, wherein the air flow rectifier is a cellular structure.

* * * * *